United States Patent [19]
Mizuta et al.

[11] Patent Number: 5,708,335
[45] Date of Patent: Jan. 13, 1998

[54] ON-CAR MOTOR DRIVING APPARATUS AND SELF-DIAGNOSING AND SELECTIVE DRIVING MECHANISMS FOR THE SAME

[75] Inventors: Ken Mizuta, Miyagi-ken; Yukio Miura, Furukawa; Toshihiko Kawata, Sendai; Ken Shibazaki, Furukawa, all of Japan

[73] Assignee: Alps Electric Co., Ltd., Tokyo, Japan

[21] Appl. No.: 662,747

[22] Filed: Jun. 10, 1996

Related U.S. Application Data

[62] Division of Ser. No. 383,265, Feb. 3, 1995, Pat. No. 5,578,912.

Foreign Application Priority Data

Feb. 4, 1994 [JP] Japan .................................. 6-012882
Feb. 7, 1994 [JP] Japan .................................. 6-013653

[51] Int. Cl.$^6$ ................................................. H02P 1/18
[52] U.S. Cl. ................................... 318/434; 318/430
[58] Field of Search ................................ 318/111, 112, 318/113, 293, 430, 431, 434

[56] References Cited

U.S. PATENT DOCUMENTS

| | | | |
|---|---|---|---|
| 4,012,674 | 3/1977 | Spitsbergen et al. | 318/7 |
| 4,288,726 | 9/1981 | Vasquez-Cuervo et al. | 318/54 |
| 4,347,465 | 8/1982 | Goertler et al. | 318/266 |
| 4,463,296 | 7/1984 | Tada et al. | 318/452 |
| 4,746,845 | 5/1988 | Mizuta et al. | 318/286 |
| 4,901,181 | 2/1990 | Miyanaga et al. | 318/434 X |
| 5,126,640 | 6/1992 | Leroy | 318/34 |
| 5,334,876 | 8/1994 | Washeleski et al. | 307/10.1 |
| 5,457,364 | 10/1995 | Bilotti et al. | 318/434 |
| 5,483,135 | 1/1996 | Parks | 318/469 |

*Primary Examiner*—Bentsu Ro
*Attorney, Agent, or Firm*—Guy W. Shoup; Patrick T. Bever

[57] ABSTRACT

An on-car motor driving apparatus is equipped with a motor for moving a moving unit such as a window of a motor car, a motor driving controller which controls the revolution, stop, and rotational direction of the motor, and a current measuring and comparing device which measures the variation in current per unit time of the motor and compares the measured variation in current with a preset value. The on-car motor driving apparatus stops the revolution of the motor and/or reverses the rotational direction of the motor through the motor driving controller. The apparatus is further equipped with a voltage measuring device for measuring motor driving voltage and a voltage-based time setting device which changes the length of the unit time in accordance with the driving voltage value measured by the voltage measuring device. Line voltage is supplied to a differential amplifier only when the line voltage is supplied to the motor.

3 Claims, 7 Drawing Sheets

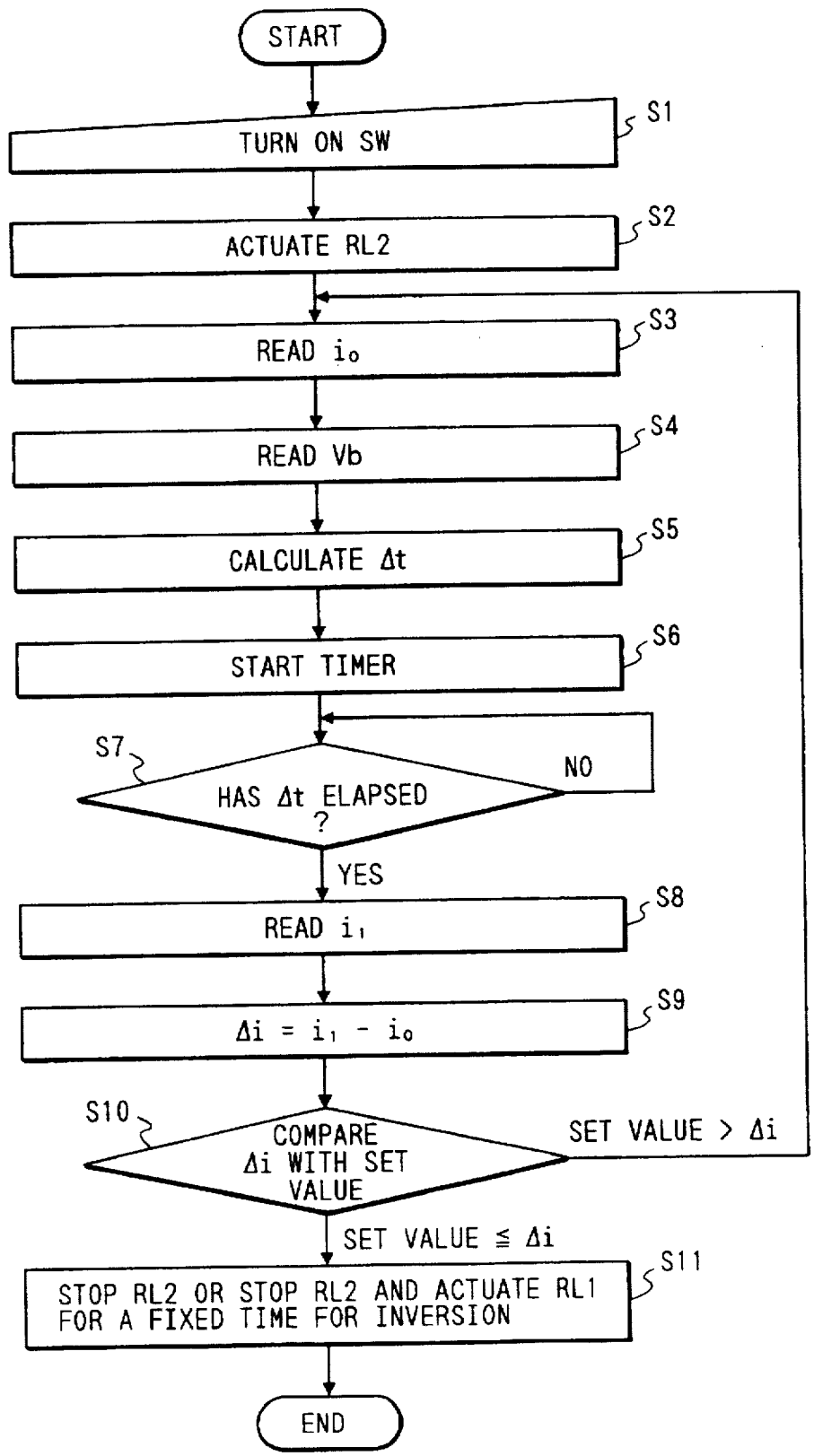

ON-CAR MOTOR DRIVING APPARATUS AND SELF-DIAGNOSING AND SELECTIVE DRIVING MECHANISMS FOR THE SAME

This application is a division of application Ser. No. 08/383,265, filed on Feb. 3, 1995, now U.S. Pat. No. 5,578,912.

BACKGROUND OF THE INVENTION

1. Field of the Invention

The present invention relates to a motor driving apparatus for a power window, power seat, etc. which are mounted on a passenger car or the like and, more particularly, to an apparatus for detecting motor problems such as lock-up, short circuit, and open circuit, and a selective driving mechanism for the motor.

2. Description of the Related Art

In recent years, more passenger cars and the like are equipped with a power window, which enables a passenger to open and close the window by operating a switch, a power seat, which enables a passenger to adjust the position of the seat or the angle of a seat back by operating a switch, and other similar on-car apparatuses. Such a power window, power seat, and other similar on-car apparatuses employ motors which use the voltage from batteries mounted on passenger cars as their line voltage, the motors being driven to open and close the windows, move the seats, or operate other on-car apparatuses.

The on-car apparatuses stated above are provided with self-diagnosing devices which detect motor failures such as lock-up, open circuit, and short circuit and stop the motors so as to clear such failures.

FIG. 9 is a circuit diagram illustrative of an embodiment of such an on-car motor driving apparatus. The apparatus is equipped with a motor 131, a selector switch 132 which has a moving contact terminal 132b, and fixed contact terminals 132a, 132c, a selector switch 133 which has a moving contact terminal 133b and fixed contact terminals 133a, 133c, a current value detecting resistor 136, a differential amplifier 137, and a microprocessor unit (MPU) 138 provided with an analog-to-digital converter (A/D converter).

The selector switches 132 and 133 are connected to the output side of the MPU 138 via a first inverter 134 and a second inverter 135, respectively; they are connected to the MPU 138 also via the differential amplifier 137 which detects the voltage across the two terminals of the current value detecting resistor 136. An operating switch 139 is provided for controlling the direction in which a moving unit moves and it is connected to the MPU 138. The current flowing through the motor 131 also flows through the current value detecting resistor 136 which is connected in series with the motor 131. The selector switches 132 and 133 are energized by a driving output of the MPU 138 which is supplied via the first inverter 134 and the second inverter 135, respectively. The terminal voltage of the current value detecting resistor 136 is detected by the differential amplifier 137 and the detected terminal voltage is supplied to the MPU 138.

The following description gives an outline of the on-car motor driving apparatus having the construction stated above.

In the drawing, if both selector switches 132 and 133 are set down in FIG. 9, i.e. if they are closed to make contact between 132b and 132c and between 133b and 133c, then the two terminals of the motor 131 are short-circuited via the selector switches 132, 133, and no power is supplied to the motor 131 which, therefore, stays in a stationary state. Hence, a moving unit such as the window does not move at all.

If the moving contact of the selector switch 132 is moved up in FIG. 9 to make contact between the moving contact terminal 132b and the fixed terminal 132a, with the selector switch 133 closed to make contact between terminals 133b and 133c then a current path is formed from a power terminal 140, through the moving contact of the selector switch 132, the motor 131, the moving contact of the selector switch 133, and the current value detecting resistor 136 to ground. This lets current flow into the motor 131, causing the motor to rotate in the forward direction. As a result, a moving unit such as the window is opened.

If the selector switch 133 is set up in the drawing to make contact between the moving contact terminal 133b and the fixed contact terminal 133a, with the selector switch 132 kept in the down position in the drawing, that is, with the moving contact terminal 132b and the fixed contact terminal 132c kept in contact, then a current path is formed which leads from a power terminal 140, through the moving contact of the selector switch 133, the motor 131, the moving contact of the selector switch 132, and the current value detecting resistor 136 to ground. This lets current flowing in the opposite direction from that in the preceding case to pass through the motor 131, causing the motor to rotate in the reverse direction. Thus, a moving unit such as the window is closed. The selector switches 132 and 133 are controlled by the MPU 138 in accordance with the state of the switch 139 which is controlled by a passenger.

Whether the motor runs in the forward or reverse direction, the motor current flows through the current value detecting resistor 136, generating a voltage which corresponds to the motor current. The generated voltage is amplified by the differential amplifier 137 which is constituted by an operational amplifier. The output voltage of the differential amplifier 137 is sent to the MPU 138, then it is converted to a digital value through the A/D converter. Based on the digital value, the MPU 138 determines whether the motor 131 has incurred a failure or not. If the result of the determination indicates a problem with the motor, the MPU 138 sets down the selector switches 132 and 133 to stop the motor 131.

The on-car motor driving apparatus constructed as described above is designed so as to be able to detect an object that is caught at the window while the window is being closed.

More specifically, as illustrated in FIG. 10A illustrative of the changes in motor current I, when the moment the motor 131 is started, an inrush current is produced, causing motor current I to rapidly rise and then rapidly fall. When the motor 131 reaches a steady state and the inrush current ends, a low steady-state value is generated. When the window is completely closed and no longer makes any movement, motor current I suddenly increases.

In the motor driving apparatus shown in FIG. 9, the MPU 138 sequentially captures the digital value data which is obtained by subjecting the outputs of the differential amplifier 137 to the A/D converter, then it determines the rate of change $\Delta I/\Delta t$ of the motor current from a difference $\Delta I$ between the digital values of two pieces of data which have been captured in succession. The MPU 138 then determines that the motor 131 has locked if the result of comparison of the rate of change with a preset positive value K' is as shown below and it sets down the selector switches 132 and 133 to stop the motor:

$\Delta I/\Delta t>K'$

Thus, when the window is closed and the motor 131 is no longer allowed to rotate, motor current I suddenly increases as indicated by the solid line in FIG. 10A. This sudden rise can be detected and the motor 131 can be stopped. The motor current suddenly increases as indicated by the solid line shown in FIG. 10A also when the window locks in the middle of closing due to something caught at the window, preventing the motor 131 from continuing its rotation. This, therefore, can also be detected and the motor 131 can be stopped.

A motor employed for an on-car apparatus such as a power window and power seat is equipped with two selector switches whereby switching between the forward rotation and the reverse rotation can be accomplished as described with reference to FIG. 9. FIG. 11 shows an example of a motor selective driving mechanism employed when two motors are involved. The motor selective driving mechanism is provided with motors 101a and 101b and selector switches 102a, 102b, 103a, and 103b.

In the drawing, the same connection as that shown in FIG. 9 applies to the connection between the selector switches 102a, 102b, 103a, and 103b, the power supply, and the grounding terminal, the self-diagnosing device composed primarily of the resistor 136 shown in FIG. 9 being omitted in this example. This construction allows the motor 101a to run in the forward or reverse direction or to be stopped by changing the setting of the selector switches 102a and 103a. In the same manner, the motor 101b can be rotated in the forward or reverse direction or it can be stopped by changing the setting of the selector switches.

FIG. 10 gives characteristic plots illustrative of the operating characteristics of the known on-car motor driving apparatus. FIG. 10A shows the changes in the current flowing through the motor 131; FIG. 10B shows the changes in the lock current when the driving voltage of the motor 131 fluctuates. In FIGS. 10A and 10B, the axis of ordinate indicates the motor current; the axis of abscissa indicates time.

The current flowing through the motor 131 exhibits the changes as shown in FIG. 10A: the current value temporarily increases because of the large inrush current coming in during the period from time t0 to time t1 which is the starting period of the movement of a moving unit such as a window. After time t1, the revolution of the motor 131 reaches the stable state and a normal current of an approximately constant value flows. When the revolution of the motor 131 is prevented because of an object having been caught at a moving unit, e.g. a window, or because of the window having reached the moving end position in time t2, a lock current, which increases within unit time $\Delta t$ (t2–t3) begins to flow. Reference character Vb denotes the voltage which is directly supplied from a car battery; its voltage value may slightly change due to an external environmental factor or it may decrease as time elapses in the course of a prolonged use. In this case, as shown in FIG. 10B, the lock current increases according to the driving voltage of the motor 131, i.e. voltage Vb supplied to the power terminal 140; the increasing curve grows steeper as driving voltage Vb increases.

In the known on-car motor driving apparatus, as shown in FIG. 10B, unit time $\Delta t$ for detecting current variation $\Delta i$ is fixed; therefore, current variation $\Delta i$ per unit time $\Delta t$ significantly varies when driving voltage Vb of the motor 131 fluctuates. Hence, current variation $\Delta i$ per unit time $\Delta t$ markedly varies with respect to any driving voltage Vb within the variation range. Accordingly, the known on-car motor driving apparatus is designed to permit the detection of current variation $\Delta i$ per unit time $\Delta t$ on any driving voltage Vb in the variation range, and therefore, a fixed value is provided as preset value $\Delta is$ which corresponds to current variation $\Delta imin$ per unit time $\Delta t$ obtained from minimum driving voltage Vbmin. With such preset value $\Delta is$ selected, however, a large motor torque results if an object is caught in a moving unit when maximum driving voltage Vbmax or driving voltage Vb close to the maximum driving voltage is being applied and the motor to be overloaded. This calls for an emergency stop of the motor to prevent the caught object from being damaged. For this reason, the circuit tends to become complicated.

Further, in the on-car motor driving apparatus illustrated in FIG. 9, whether the motor 131 is running or not, power is constantly supplied from the battery to the power supply terminals of the operational amplifier constituting the differential amplifier 137. Hence, the self-diagnosing device of the on-car motor driving apparatus constantly consumes power. The power window or power seat, however, is not used very often; therefore, the constant supply of power to the self-diagnosing device results in the wasteful consumption of a vast amount of power. This presents a serious problem especially when a battery provides the power source.

Furthermore, as shown in FIG. 10A, the on-car motor driving apparatus enables the detection of a failure in the middle of the operation of the power window or power seat. If the apparatus were designed to determine that a failure has occurred whenever the comparison result indicates $\Delta I/\Delta t>K'$ as described above, then the following problem would arise: motor current I at the time of start of the motor 131 rapidly increases because it develops an inrush current as shown in FIG. 10A, and since the rate of variation $\Delta I/\Delta t$ of motor current I at that time would satisfy the expression given above, the MPU would determine that a failure has occurred and consequently stop the motor 131. As a result, the opening or closing of the power window, for example, would be interrupted.

To avoid the problem mentioned above, the known self-diagnosing device is designed not to detect a failure of the motor 131 during inrush current generating period T (e.g. 100 msec) before motor current I reaches the steady-state current since the start-up of the motor 131. This, however, gives rise to the following inconvenience: in the case of a power window, for example, when the motor 131 is actuated to close the window, which has been closed halfway, with something stuck in the window, the motor 131 is allowed to run only for a short time period before it is brought to a stop. Therefore, the rising motor current I due to the failure overlaps the inrush current at the time of the start-up, making it impossible detect the failure because it happens during the period when the inrush current takes place.

Furthermore, in the selective driving mechanism of the on-car motor driving apparatus shown in FIG. 11, each motor requires two selector switches. Hence, as the number of motors increases, the required number of selector switches increases accordingly. The selector switches are costly relay switches which are controlled by a microprocessor unit. An increase in the number of required selector switches therefore adds greatly to the price of the power window, power seat or other car-mounted apparatus.

SUMMARY OF THE INVENTION

The first object of the present invention is to provide an on-car motor driving apparatus wherein the motor load is maintained at a constant level even when an object is stuck in a moving unit regardless of the fluctuation in the motor driving voltage.

The second object of the present invention is to provide a self-diagnosing device of a motor for an on-car apparatus, which self-diagnosing device being capable of achieving dramatically reduced power consumption by supplying power only when the motor is operated.

The third object of the present invention is to provide a self-diagnosing device for an on-car apparatus, which self-diagnosing device being capable of detecting a motor failure even at the time of start-up.

The fourth object of the present invention is to provide a motor driving device for an on-car apparatus, which motor driving device enables a reduced number of switching means and permits the selection between the reverse rotating direction and the forward rotating direction of a plurality of motors.

To these ends, according to the present invention, there is provided a motor driving apparatus which is provided with a motor for moving a moving unit, a motor driving controller for controlling starting, stopping, and rotational direction of the motor, and a current measuring and comparing device which measures the variation in current per unit time of the motor and compares the variation in current with a preset value; the motor driving apparatus being able to stop the revolution of and/or reverse the rotational direction of the motor through the motor driving controller when a current variation exceeding the present value is detected through the current measuring and comparing device, and being further equipped with a voltage measuring device for measuring the motor driving voltage and a voltage-based time setting device for changing the length of the aforesaid unit time in accordance with the driving voltage value measured by the voltage measuring device.

Further, the motor driving apparatus according to the present invention determines that the motor has incurred a failure if the rate of variation of the motor current $\Delta I/\Delta t$ with respect to value K, which is a preset sufficiently small positive value, is $\Delta I/\Delta t < -K$.

The motor driving apparatus according to the present invention is further provided with a first switching means for selectively connecting the terminals on one side of respective motors to either a battery or the ground, a second switching means for selecting one of the terminals on the other side of the respective motors, and a third switching means for selectively connecting the second switching means to either the battery or the ground.

The motor driving apparatus according to the present invention is provided with a voltage measuring device for measuring the motor driving voltage and a voltage-based time setting device which detects the variation in motor current from the driving voltage value measured by the voltage measuring device and changes the length of the unit time in accordance with the detected variation in current, so that, if the driving voltage is lower than a normal voltage value, then the length of the unit time is increased according to the voltage value, or if the driving voltage is higher than the normal voltage value, then the length of the unit time is decreased.

Thus, the length of the unit time is changed in accordance with the motor driving voltage; therefore, the variation per unit time in the current flowing through the motor no longer depends on the driving voltage value, enabling a fixed amount of variation in current at all times. This makes it possible to maintain constant motor torque and motor load when a stuck object is detected, regardless of the fluctuation in the driving voltage.

According to another example, power is supplied to the amplifier only while the switch is ON and the motor is running, thereby preventing the amplifier from wastefully consuming power.

Furthermore, even if the motor incurs a failure due to something caught in the window or the like at the start-up of the motor and a large motor current develops on the start-up of the motor, disabling the motor from running and maintaining the current value at the large inrush current, the value does not rapidly go down to the steady-state current value which is a small value. Thus, it is determined that the motor is in an abnormal condition at the time of start-up if the motor current does not rapidly decrease from the inrush current to the steady-state current, and if rate of variation in motor current, $\Delta I/\Delta t$, is smaller than a negative value $-K$ which is sufficiently small, then it means that the motor current did not rapidly fall from the inrush current to the steady-state current, thus making it possible to determine that the motor has a problem at the time of start-up.

In addition, the first and third switching means function to select whether the motors should be connected to the battery or grounded in accordance with the direction of the rotation of the motors. Hence, the number of the switching means does not increase even when the number of the motors increases; only the scale of the second switching means for selecting the motors increases, the scale being increased just in proportion to the number of the switching means. There will be less chance, therefore, of an increase of the number of switching means than in the known embodiment.

BRIEF DESCRIPTION OF THE DRAWINGS

FIG. 3 is a flowchart showing the operation sequence of the on-car motor driving apparatus according to the embodiment shown in FIG. 1;

DESCRIPTION OF THE PREFERRED EMBODIMENTS

The embodiments of the present invention will be described in detail with reference to the accompanying drawings.

Figure 1:
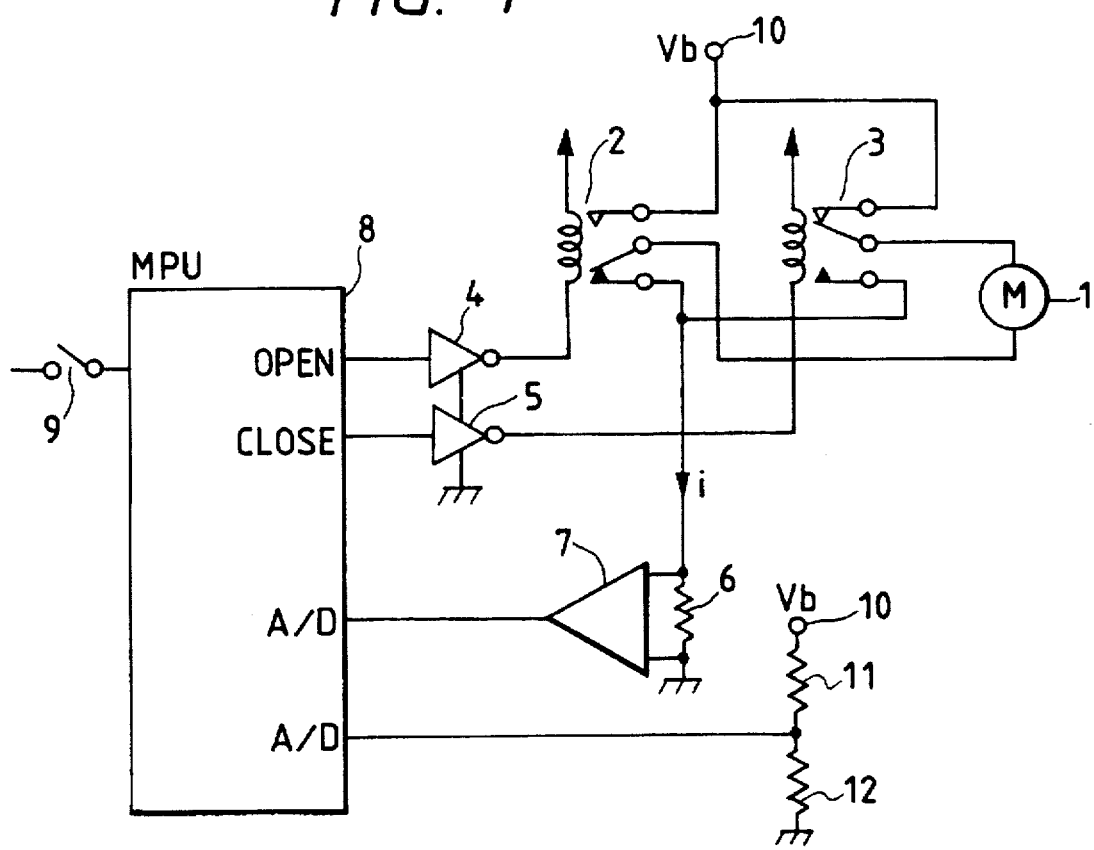
FIG. 1 is a circuit block diagram illustrative of the construction of an embodiment of an on-car motor driving apparatus in accordance with the present invention.

FIG. 1 is the circuit block diagram illustrative of the construction of the embodiment of the on-car motor driving apparatus in accordance with the present invention.

In FIG. 1, the motor 1 is a DC motor with one end thereof connected to the moving contact of a first relay 2 and the other end thereof connected to the moving contact of a second relay 3, so that current is let flow into the motor 1 in one direction or in the opposite direction from that, or the supply of current to the motor 1 is stopped by changing the connection of the moving contacts of the first relay 2 and second relay 3. The current of the motor 1 flows to a grounding point through a current value detecting resistor 6 which is connected in series with the motor 1. The first relay 2 and the second relay 3 are energized or de-energized in accordance with a driving output supplied from a microprocessor unit (MPU) 8, i.e. the output levels of the OPEN and CLOSE terminals of the MPU 8, via a first inverter 4 and a second inverter 5, respectively. The current value detecting resistor 6 has its both ends connected to the two input terminals of a differential amplifier 7; the terminal voltage thereof is detected by the differential amplifier 7 and supplied to the MPU 8. A first potential dividing resistor 11 and a second potential dividing resistor 12 are connected between a power terminal 10 and a grounding point. A potential dividing output of the line voltage (driving voltage) Vb which is obtained at the grounding point of the first potential dividing resistor 11 and the second potential dividing resistor 12 is supplied to the MPU 8. A switch 9 is used to move a moving unit (actuator); it is provided for each moving direction of the moving unit and connected to the MPU 8.

The MPU 8 incorporates a motor driving controller which controls the revolution and stop of the motor 1 and also the direction of rotation of the motor 1; a current measuring and comparing device which measures the variation in current per unit time during which the driving current flows through the motor 1 compares the measured variation in current with a preset value, and supplies, when the variation in current exceeds the preset value, the detected output to the motor driving apparatus; a voltage measuring device which measures driving voltage Vb of the motor 1; and a voltage-based time setting device which changes the length of the unit time in accordance with the magnitude of driving voltage Vb measured by the voltage measuring device. In this case, the MPU 8 carries out the internal data processing digitally and the entered analog data such as voltage is converted to digital data before it is subjected to required processing. The motor 1 is designed to actuate a moving unit such as a window, sunroof, and seat of a car when it is driven.

The on-car motor driving apparatus which is configured as described above performs the following operations. In this embodiment, it is assumed that the moving unit, which is moved when the motor 1 is driven, is a window.

The on-car motor driving apparatus according to this embodiment operates in the same manner as the known on-car motor driving apparatus already discussed; it sets the outputs of the OPEN and CLOSE terminals of the MPU 8 at low-level voltage (L). The low-level voltage (L) is changed to high-level voltage (H) by the first inverter 4 and the second inverter 5 and the high-level voltage (H) is applied to the ends on one side of the first relay 2 and the second relay 3. In this case, the high-level voltage (H) is applied to the ends on the other side of the first relay 2 and the second relay 3 at all times; therefore, the first relay 2 and the second relay 3 are not energized, the moving contacts thereof being set to the fixed contact side (set down in FIG. 1). Thus, no current is supplied to the motor 1 and the window does not move at all.

The on-car motor driving apparatus according to this embodiment also performs the same operation as the known on-car motor driving apparatus when opening the window; it switches the output of only the OPEN terminal of the MPU 8 from the low-level voltage (L) to the high-level voltage (H). The high-level voltage (H) is switched to the low-level voltage (L) by the first inverter 4 before it is supplied to one end of the first relay 2. This energizes the first relay 2 and the moving contact of the first relay 2 is switched from one fixed contact (the down position in FIG. 1) to the other fixed contact (the up position in FIG. 1). At this time, the moving contact of the second relay 3 is still in the original set position; therefore, a current path is formed which leads to the grounding point via the power terminal 10, the moving contact of the first relay 2, the motor 1, the moving contact of the second relay 3, and the current value detecting resistor 6. The formed current path lets current flow through the motor 1 to open the window, the current flowing from the bottom toward the top in FIG. 1.

The on-car motor driving apparatus according to this embodiment also performs the same operation as the known on-car motor driving apparatus when closing the window which is stationary; it switches the output of only the CLOSE terminal of the MPU 8 from the low-level voltage (L) to the high-level voltage (H). The high-level voltage (H) is switched to the low-level voltage (L) by the second inverter 5 before it is supplied to one end of the second relay 3. This energizes the second relay 3. Since the moving contact of the second relay 3 is still in contact with one fixed contact (the down position in FIG. 1), a current path is formed which leads to the grounding point via the power terminal 10, the moving contact of the second relay 3, the motor 1, the moving contact of the first relay 2, and the current value detecting resistor 6. The formed current path lets current to flow through the motor 1 to close a moving unit, e.g. a window, the current flowing in the opposite direction from that in the preceding case.

The following will describe how the motor driving apparatus behaves if some object is caught in a window which is moving in a certain direction while the motor 1 is being driven or the window reaches a moving limit point, causing the lock current to flow through the motor 1.

In this embodiment, when the motor 1 is driven, the current flowing through the motor 1 also flows through the current value detecting resistor 6. Therefore, the value of the current flowing through the motor 1 can be determined from the output voltage of the differential amplifier 7 by detecting the terminal voltage of the current value detecting resistor 6 through the differential amplifier 7. The output voltage is supplied to the current measuring and comparing device in the MPU 8 and the output voltage is converted to a digital output. The current measuring and comparing device is equipped with a built-in timer circuit for marking unit time $\Delta t$; it measures the difference between the digital output voltage at the moment the timer circuit is actuated and that at the moment the timer circuit marks the set time, that is, it measures current variation $\Delta i$ per unit time $\Delta t$ of the motor 1, and it compares the measured current variation $\Delta i$ with a preset value stored in the current measuring and comparing device.

If the lock current starts to flow through the motor 1 because something has stuck in the window or the window has reached its moving limit point, resulting in a sudden rise in the current value, then the current measuring and comparing device detects that the variation in current has exceeded the preset value and issues a detection output which is supplied to the motor driving controller also included in the MPU 8. In response to the detection output, the motor driving controller switches the output of the OPEN terminal or CLOSE terminal of the MPU 8 from the high level (H) to the low level (L) to stop the revolution of the motor 1, thereby stopping the movement of the window. If necessary, the motor driving controller reverses the revolution of the motor 1 by inverting the output voltage levels of the OPEN terminal and CLOSE terminal, thereby moving the window in the reverse direction.

In the embodiment, line voltage Vb (the driving voltage of the motor 1) supplied to the motor 1 is supplied to the first potential dividing resistor 11 and the second potential dividing resistor 12, the voltage at the connection point of the first and second potential dividing resistors 11, 12 being supplied to the voltage measuring device in the MPU 8 as a power-dependent voltage which represents the fluctuation in the line voltage (driving voltage) Vb. The voltage measuring device converts the power-dependent voltage into digital data and supplies it to the voltage-based time setting device in the MPU 8. The voltage-based time setting device changes the length of unit time $\Delta t$ of the current measuring and comparing device in accordance with the received power-dependent voltage which has been converted to digital data. If the normal value of line voltage (driving voltage) Vb is set to 12 V, for example, the value applied when line voltage (driving voltage) Vb fluctuates over 12 V is set to 16 V, for example, and the value applied when line voltage (driving voltage) Vb fluctuates below 12 V is set to 9 V, for example, then the voltage-based time setting device sets the length of unit time $\Delta t$ to the normal length $\Delta t1$ when line voltage (driving voltage) Vb is 12 V, or sets the length of unit time at to $\Delta t0$, which is shorter than $\Delta t1$, when line voltage (driving voltage) Vb is 16 V, or it sets the length of unit time $\Delta t$ to $\Delta t2$, which is longer than $\Delta t1$, when line voltage (driving voltage) Vb is 9 V. Further, the voltage-based time setting device changes the length of unit time $\Delta t$ in accordance with the voltage value when the line voltage (driving voltage) Vb lies between 16 V and 12 V or between 12 V and 9 V.

Figure 2A:
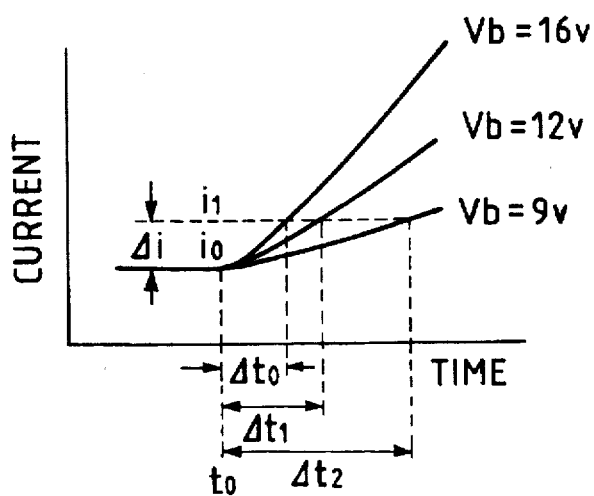
FIG. 2A is a characteristic chart illustrative of the operating characteristics of the on-car motor driving apparatus according to the embodiment shown in FIG. 1; it shows the changes in the lock current flowing through the motor 1, the changes being caused by the fluctuation of line voltage (driving voltage) Vb.
Figure 2B:
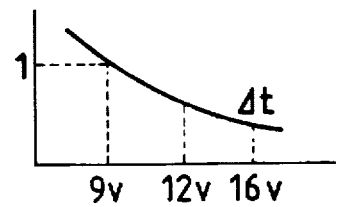
FIG. 2B is a characteristic chart illustrative of the operating characteristics of the on-car motor driving apparatus according to the embodiment shown in FIG. 1; it shows the changes in unit time at caused by the fluctuation of line voltage (driving voltage) Vb.

FIG. 2 are the characteristic charts showing the operating characteristics of the on-car motor driving apparatus according to the embodiment. FIG. 2A shows the changes in the lock current flowing through the motor 1, the changes being caused by the fluctuation of line voltage (driving voltage) Vb; FIG. 2B shows the changes in unit time $\Delta t$ caused by the fluctuation of line voltage (driving voltage) Vb.

In FIG. 2A, the axis of ordinate indicates the motor current and the axis of abscissa indicates time. In FIG. 2B, the axis of ordinate indicates unit time $\Delta t$ and the axis of abscissa indicates line voltage (driving voltage) Vb.

As illustrated in FIG. 2B, with the length of unit time $\Delta t$ set as the normal length $\Delta t1$ when line voltage (driving voltage) Vb is the steady-state value of 12 V, if line voltage (driving voltage) Vb fluctuates over the steady-state value 12 V, then the length of unit time $\Delta t$ is made shorter than the aforesaid $\Delta t1$ according to the fluctuation, or if line voltage (driving voltage) Vb fluctuates below the steady-state value of 12 V, then the length of unit time $\Delta t$ is made longer than the aforesaid $\Delta t1$ according to the fluctuation.

Further, as shown in FIG. 2B, the curve of the lock current flowing into the motor 1 indicates a steeper increase when line voltage (driving voltage) Vb is 16 V, which is larger than the steady-state value, 12 V, than the increase observed when line voltage (driving voltage) Vb is the steady-state value, 12 V; conversely, the increase curve is gentler when line voltage (driving voltage) Vb is 9 V which is smaller than the steady value, 12 V. A constant detection level of current variation value $\Delta i$ of the motor 1, i.e. a constant level of current variation value $\Delta i$ based on which an output of the comparison between current variation value $\Delta i$ and the preset value is obtained, can be maintained regardless of the fluctuation of line voltage (driving voltage) Vb by changing the length of unit time $\Delta t$ in accordance with the steepness of the increase curve of the lock current as follows: the length of unit time $\Delta t$ for line voltage (driving voltage) Vb of 16 V, for example, is changed to $\Delta t0$, which is shorter, when the lock current increase is steep; if the lock current increase is steep with respect to $\Delta t1$ of unit time $\Delta t$ for line voltage (driving voltage) Vb of the steady-state value, 12 V, then the length of unit time $\Delta t$ for line voltage (driving voltage) Vb of 16 V, for example, is changed to $\Delta t0$ which is shorter than the aforesaid $\Delta t1$; if the lock current increase is gentle, then the length of unit time $\Delta t$ for line voltage (driving voltage) Vb of 9 V, for example, is changed to $\Delta t2$ which is longer than the aforesaid $\Delta t1$.

Thus, according to the embodiment, unit time $\Delta t$ is changed in accordance with the fluctuation of line voltage (driving voltage) Vb of the motor 1 and therefore current variation $\Delta i$ per unit time $\Delta t$ no longer depends on line voltage (driving voltage) Vb. This makes it possible to detect a fixed amount of current variation in the motor 1 at all times; therefore, both the motor torque and motor load at the time when a stuck object is detected can be maintained at a fixed level, ensuring stable operation.

FIG. 3 is the flowchart showing the operation sequence of the on-car motor driving apparatus according to the embodiment; it summarizes the operation of the motor driving apparatus according to the embodiment discussed above.

Referring to FIG. 3, the operation of the motor driving apparatus according to the embodiment will be explained again. In this flowchart also, the moving unit is assumed to be a window, and the example refers to the operation for opening the window.

To begin with, the opening switch 9 is pressed in step S1 and the MPU 8 sends output voltage of high level (H) to the OPEN terminal. In the subsequent step S2, the output voltage of high level (H) applied by the MPU 8 energizes the first relay 2, causing current to flow through the motor 1. At this time, the window begins to move in the opening direction. In step S3, the current measuring and comparing device in the MPU 8 measures the terminal voltage of the current value detecting resistor 6 which has been detected through the differential amplifier 7 and reads the current i0 flowing through the motor 1. Then, in step S4, the voltage measuring device of the MPU 8 reads the voltage at the connection point of the first and second potential dividing resistors 11 and 12, i.e. the power-dependent voltage which represents line voltage (driving voltage) Vb. In Step S5, the voltage-based time setting device of the MPU 8 calculates and sets unit time Δt in the current measuring and comparing device in accordance with the power-dependent voltage which has been read through the voltage measuring device. Then, in step S6, the current measuring and comparing device starts the built-in timer circuit. In step S7, the MPU 8 determines whether the set unit time Δt mentioned above has elapsed since the timer circuit was started. If unit time Δt has elapsed, then the program proceeds to the next step S8; if unit time Δt has not yet elapsed, then the same step S7 is repeated.

Next, in step S8, the current measuring and comparing device measures again the terminal voltage of the current value detecting resistor 6 which has been detected by the differential amplifier 7 and reads current i1 flowing through the motor 1. In step S9, the current measuring and comparing device determines the difference between the two read currents i0 and i1, i.e. current variation Δi (i1−i0) per unit time Δt. In step S10, the current measuring and comparing device compares current variation Δi with preset value Δis. If the comparison result indicates Δis>Δi, then the program goes back to step S3 to repeat the steps from S3 and after; if the comparison result indicates Δis≦Δi, then the program proceeds to the next step S11. Lastly, in step S11, the output voltage of high level (H) of the OPEN terminal or CLOSE terminal received from an MPU 138 is switched to the low level (L) output voltage so as to stop energizing the first relay 2 or the second relay 3, thereby cutting off the current supplied to the motor 1. This causes the window to stop moving in the opening direction. Further, in step S11, as necessary, the levels of the output voltage of the OPEN terminal and the CLOSE terminal sent from the MPU 8 are inverted to reverse the energized and unenergized states of the first relay 2 and the second relay 3 in order to switch the direction of the window moving in the flowing direction of current for driving the motor 1 to the closing direction.

In the embodiment described above, a single microprocessor 8 incorporates the motor driving controller, the current measuring and comparing device, the voltage measuring device, and the voltage-based time setting device. The present invention, however, is not limited to such embodiment; the respective devices mentioned above may be configured discretely or may be incorporated in two or more microprocessors.

Further, in the example described above, the steady-state value of line voltage (driving voltage) Vb is 12 V and the fluctuation of line voltage (driving voltage) ranges from 9 V to 16 V. The steady-state value and fluctuation range of line voltage (driving voltage) Vb in the present invention, however, are not limited to them; they may be changed according to individual cases.

Furthermore, in the embodiment given above, the current value detecting resistor 6 and the differential amplifier 7 are used as the current detecting means for detecting current i0 and i1 flowing through the motor 1; and the first and second potential dividing resistors 11 and 12 are used as the voltage detecting means for detecting line voltage (driving voltage) Vb; the current detecting means and the voltage detecting means in the present invention, however, are not limited to the constructions mentioned above; it is apparent that other means may be employed.

Another embodiment of the present invention will now be described in conjunction with the accompanying drawings.

Figure 4:
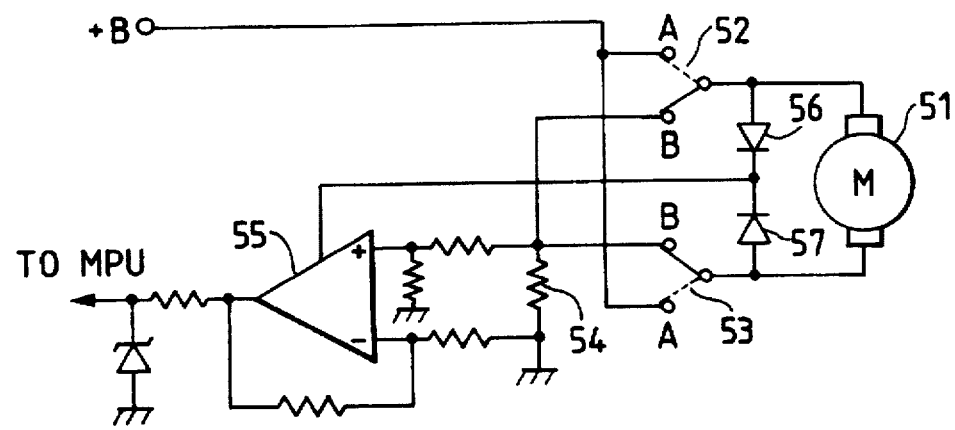
FIG. 4 is a circuit diagram illustrative of an embodiment of a self-diagnosing device of an on-car motor driving apparatus in accordance with the present invention.

FIG. 4 is the circuit diagram illustrative of an embodiment of a self-diagnosing device of an on-car motor driving apparatus in accordance with the present invention. In the drawing, the anode of a diode 56 is connected between the moving contact of a selector switch 52 and one terminal of a motor 51; the anode of a diode 57 is connected between the moving contact of a selector switch 53 and the other terminal of the motor 51. The cathodes of both diodes 56 and 57 are connected to the power terminal of an operational amplifier constituting a differential amplifier 55. These selector switches 52 and 53 are relay switches, for example, and they are controlled by the MPU in response to operational action taken by a passenger.

In such a construction, if the selector switches 52 and 53 are set to make contact with B side, so that battery voltage +B is not applied to the motor 51, keeping the motor at rest, then no positive battery voltage is applied to the anodes of the diodes 56 and 57; therefore, no line voltage is applied to the operational amplifier. This means that no power is consumed by the differential amplifier while the motor 51 is at rest.

If the selector switch 52 is set to the A side and the switch 53 to the B side to cause the motor 51 to rotate in the forward direction, then the battery voltage +B is supplied as the line voltage to the operational amplifier via the selector switch 52 and the diode 56. This actuates the differential amplifier 55 and the self-diagnosis of the motor 51 is carried out. Further, if the selector switch 52 is set to the B side and the switch 53 to the A side to cause the motor 51 to rotate in the reverse direction, then the battery voltage +B is supplied as the line voltage to the operational amplifier via the selector switch 53 and the diode 57. This actuates the differential amplifier 55 and the self-diagnosis of the motor 51 is carried out.

Thus, according to this embodiment, only when the battery voltage +B is applied and the motor 51 requires self-diagnosis, the line voltage is supplied to the amplifier 55 to perform the self-diagnosis. This prevents the self-diagnosing device from wastefully consuming power while no battery voltage +B is being applied to the motor 51, thereby dramatically reducing the power consumed by the self-diagnosing device.

Figure 5:
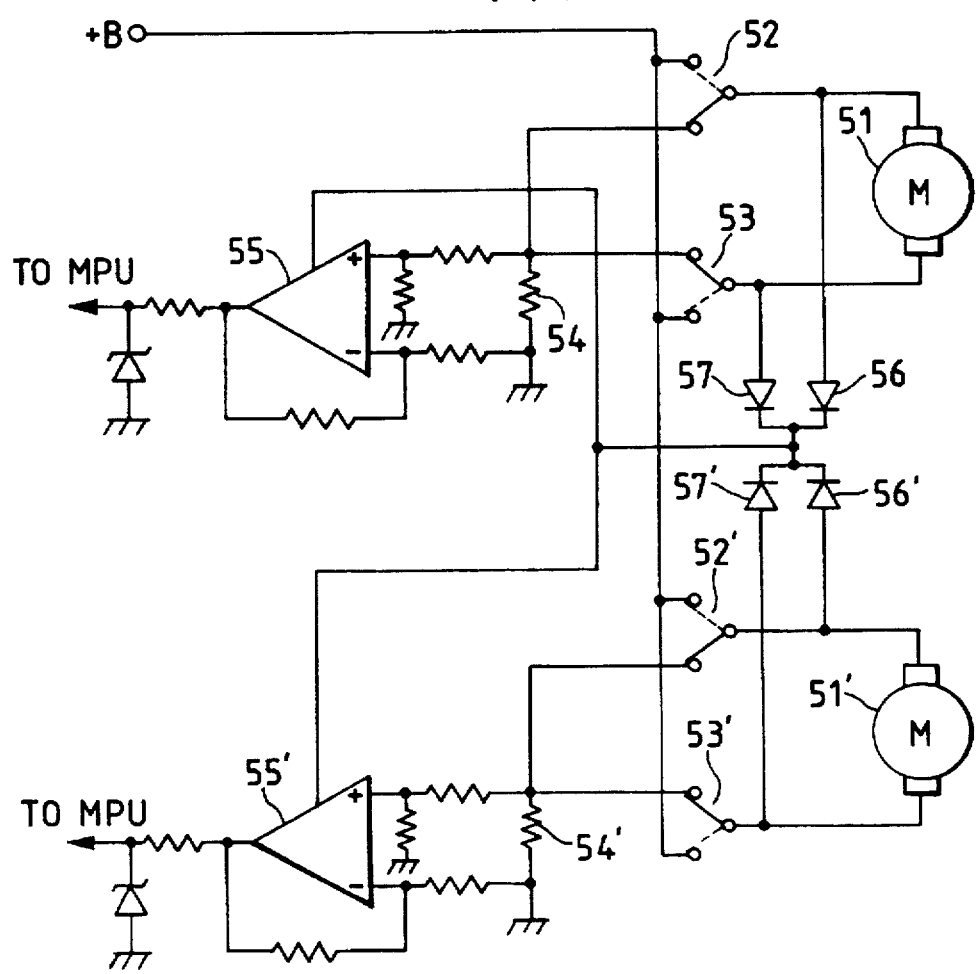
FIG. 5 is a circuit diagram illustrative of the construction of the embodiment shown in FIG. 4, two motors being included in the construction.

FIG. 5 shows a case wherein two motors are employed in the embodiment shown in FIG. 4. The apparatus in FIG. 5 is provided with a motor 51', selector switches 52', 53', a current value detecting resistor 54', a differential amplifier 55', and diodes 56', 57'; the components which correspond to those shown in FIG. 4 will be assigned the same reference numerals, overlapping explanation being omitted.

The example shown in the drawing has the motor 51' which has been added to the motor 51 equipped with the self-diagnosing device which is constituted by the resistor 54, the differential amplifier 55, etc. as in the case of the embodiment shown in FIG. 4. The motor 51' is also equipped with a self-diagnosing device constituted by the resistor 54', the differential amplifier 55', etc.

As in the case of the motor 51, the anode of the diode 56' is connected between the moving contact of the selector switch 52' and one terminal of the motor 51', and the anode of the diode 57' is connected between the moving contact of the selector switch 53' and the other terminal of the motor 51'. The cathodes of both diodes 56' and 57' are connected to the power terminal of the operational amplifier constituting the differential amplifier 55'.

If it is assumed that the MPU controls either the selector switches 52, 53 or the selector switches 52', 53' and one or both of the motors 51 and 51' rotate, then the battery voltage +B is applied as the line voltage to the differential amplifiers 55, 55', causing both self-diagnosing devices 55, 55' to operate. In this case, if only one motor, the motor 51, for example, is rotated, the MPU senses it and therefore does not capture the output of the dormant differential amplifier, i.e. the operational amplifier 55' in this case.

In this way, the same operation is carried out even when three or more motors are employed. It is possible to apply the line voltage to the self-diagnosing device only when the line voltage is applied to the motor even when a plurality of motors are used.

Alternatively, the line voltage may be applied only to the differential amplifier of the self-diagnosing device of the motor to which the battery voltage +B is applied.

Figure 6:
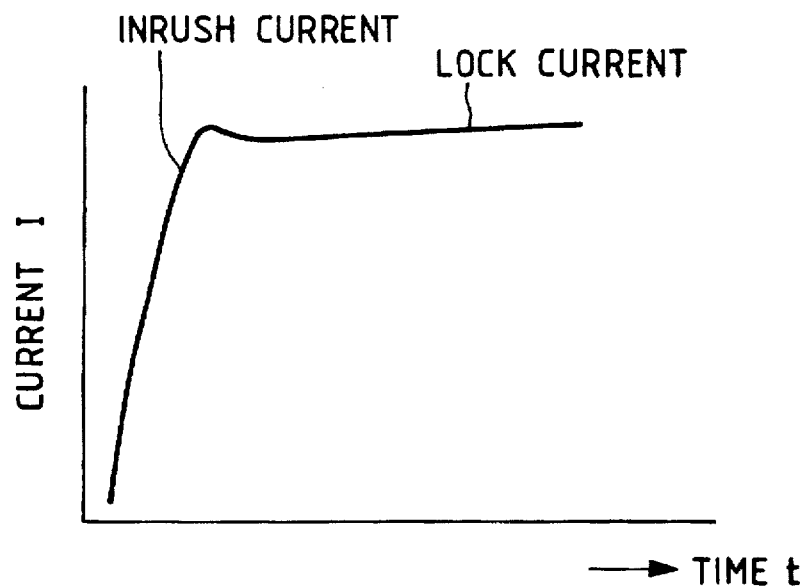
FIG. 6 shows the changes in the motor current shown in FIG. 4, the changes being caused by a failure of the motor at the time of start-up.

FIG. 6 shows the changes in the motor current caused by a failure of the motor at the time of start-up.

As explained with reference to FIG. 9, the known on-car motor driving apparatus is designed to be actuated after the inrush current period of the motor current is over. This embodiment is designed to be actuated upon the start-up of the motor.

In FIG. 4, taking a power window as an example, if something is stuck in the window while the motor 51 is at rest and if the motor 51 is started with the stuck object stuck in the window, then the motor current changes as illustrated in FIG. 6. More specifically, the moment the motor 51 is started, motor current I suddenly rises and develops the inrush current. Although the motor 51 attempts to run, it is allowed to rotate only slightly before it is halted. Motor current I passes the peak of the inrush current and slightly goes down but it maintains the large current value.

The MPU continues to capture the data which is obtained by subjecting the outputs of the differential amplifier 55 to the A/D conversion since the motor 51 was started, determines difference ΔI between the digital values of two pieces of data captured in succession, and further determines rate of variation ΔI/Δt of the motor current, which rate is obtained by dividing difference ΔI by period at of the sampling pulse of the A/D converter. The MPU then compares the determined rate of variation ΔI/Δt with a preset sufficiently small negative value −K in order to decide whether the motor 51 has a failure or not.

If the motor 51 has a failure from the start-up thereof as stated above, rate of variation becomes ΔI/Δt <−K as soon as the peak of the inrush current of the motor current is over, thus enabling the MPU to detect the failure of the motor. The MPU, upon the detection of the failure, switches the connection of the selector switches 52, 53 to the B side to stop the motor 51 or changes the contact of the selector switches 52, 53 to rotate the motor 51 in the reverse direction to open the window as shown in FIG. 4.

Thus, if, for example, a part of passenger's body should be caught in the window as soon as the motor 51 is actuated, the window can be immediately stopped or opened.

Figure 9:
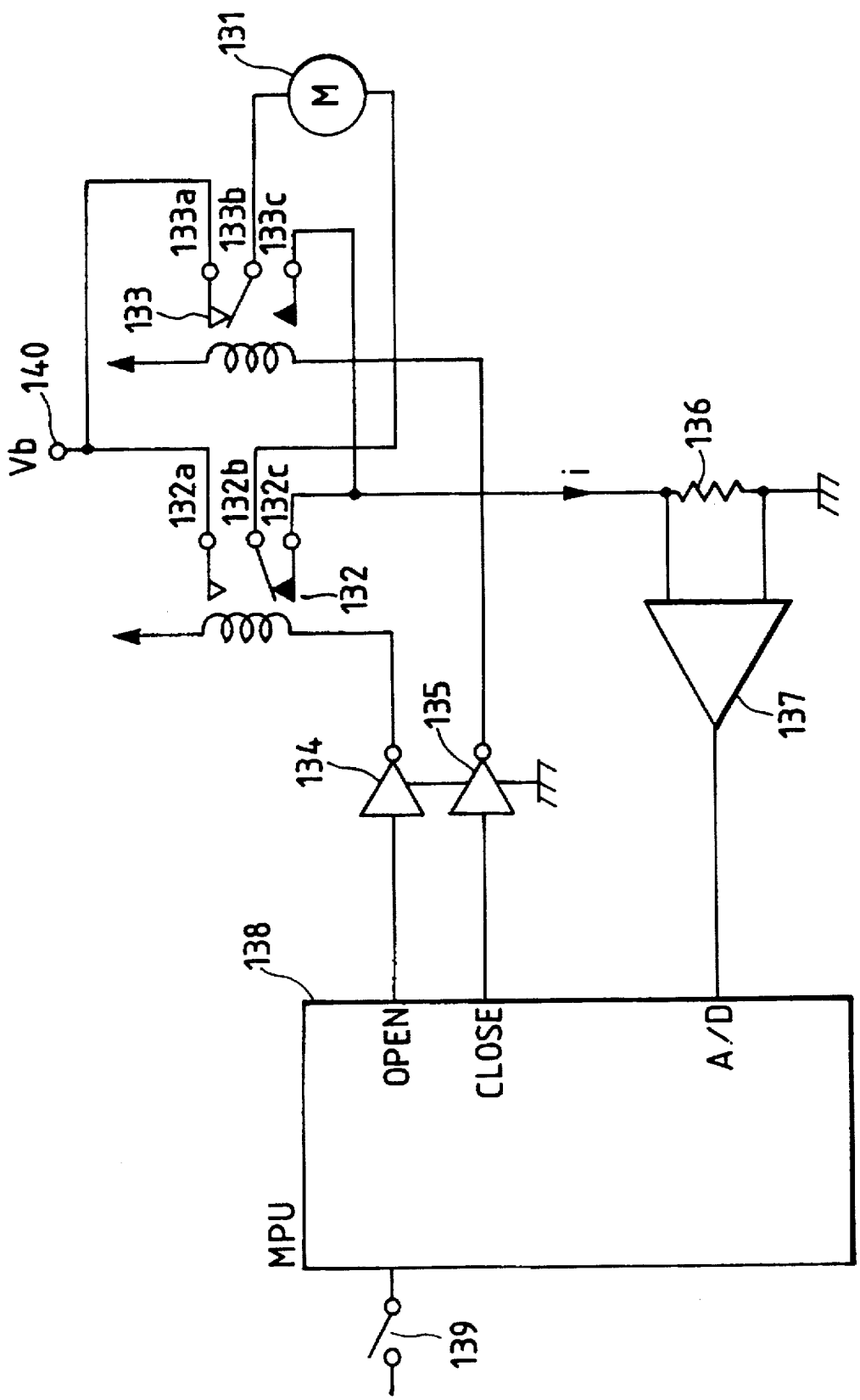
FIG. 9 is circuit block diagram illustrative of the schematic construction of an example of a known on-car motor driving apparatus.
Figure 10A:
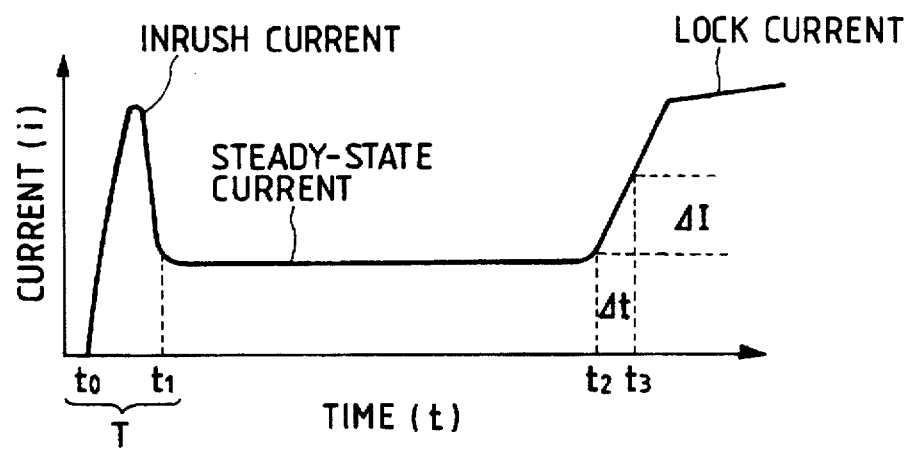
FIG. 10A is a characteristic chart illustrative of the operating characteristics of the known on-car motor driving apparatus; it shows the changes in the lock current flowing through the motor 131, the changes taking place when line voltage (driving voltage) Vb fluctuates.
Figure 10B:
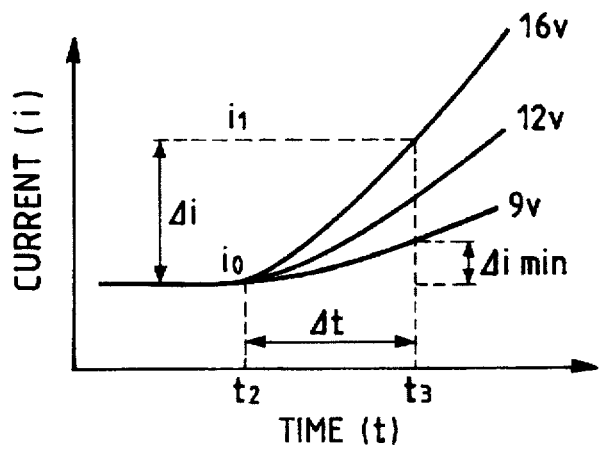
FIG. 10B is a characteristic chart illustrative of the operating characteristics of the known on-car motor driving apparatus; it shows the changes in unit time Δt which takes place when line voltage (driving voltage) Vb fluctuates.

If an object is stuck in the window, preventing the motor 51 from continuing its revolution after the inrush current phase of motor current I is over, then the MPU behaves in the same manner as the known self-diagnosing device explained with conjunction with FIG. 9. Specifically, the MPU detects the relationship between variation rate of the detected motor current ΔI/Δt and a preset large positive value K', that is, ΔI/Δt>K', and it determines that the motor 51 has incurred a failure, then it either stops the motor 51 or inverts the revolution of the motor 51 as described above.

Figure 7:
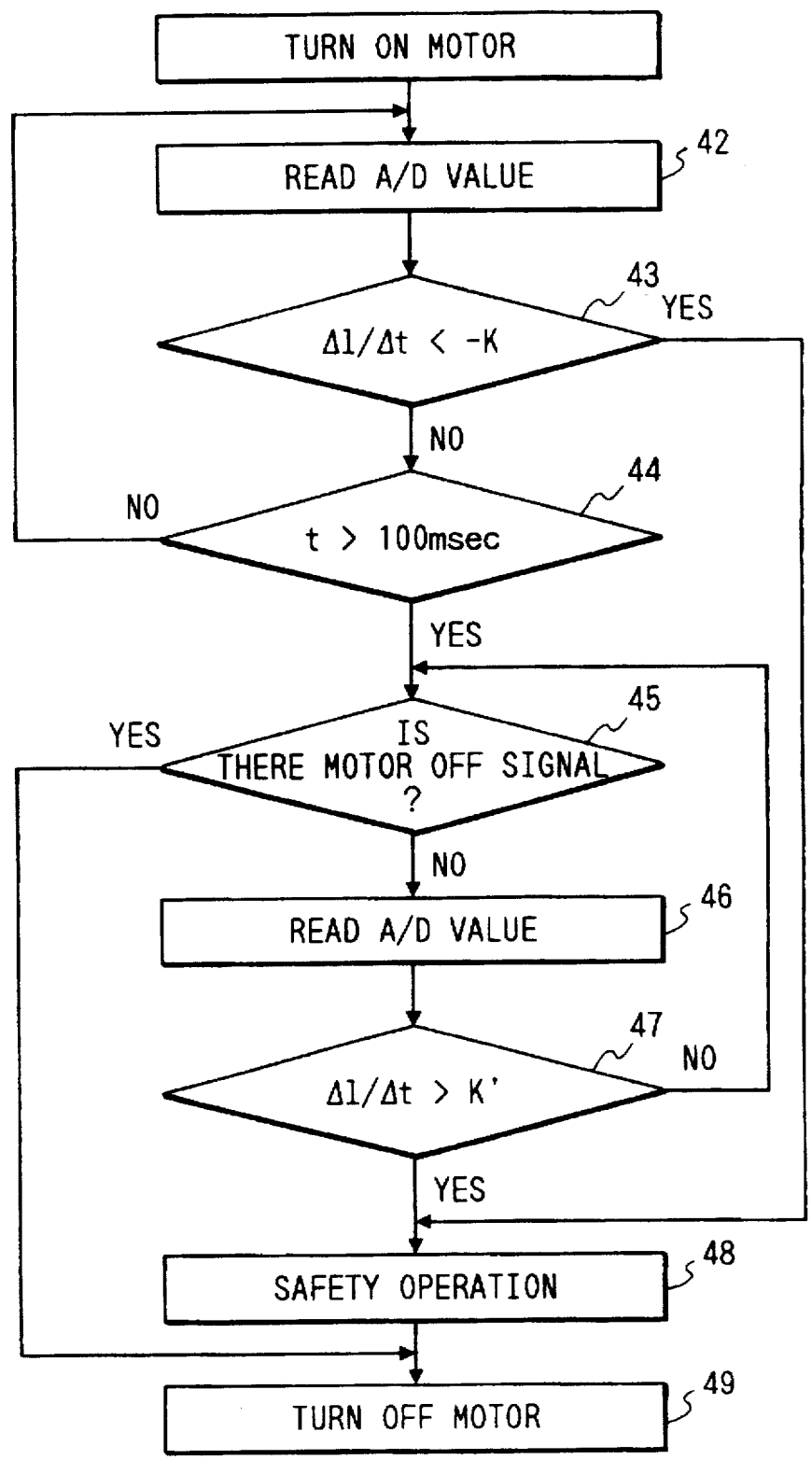
FIG. 7 is a flowchart showing a series of operations performed in relation to the motor current shown in FIG. 6 for detecting a motor failure which takes place when the motor is started.

FIG. 7 is the flowchart showing the operations described above.

In the flowchart, a series of operations in steps 42, 43, and 44 is repeated during the inrush current period of the motor current (the period is set to 100 msec in this example). If no failure with the motor 51 is detected during the period, then the series of operations in the steps 45, 46, and 47 is repeated until the opening or closing of the window is completed or until the motor 51 can no longer rotate because of an object stuck in the window. If the window is closed or something is caught in the window in the middle of closing, then it is detected in the step 47 and the safety operation stated above is carried out to stop the motor 51 (step 49). The operations discussed above are the same as those explained in conjunction with FIG. 9.

If the motor 51 incurs a failure as stated above during the inrush current period, then the failure is detected in the step 43 and the safety operation is carried out (step 48) to stop the motor 51.

If the operation for stopping the motor 51 is performed in the middle of the opening or closing of the window, then the microprocessor detects it (step 45) and stops the motor 51 (step 49).

Although the power window is taken as an example to describe the invention in the description given above, other on-car apparatuses including a power seat can be taken as examples in the same manner for the purpose of describing the invention.

Figure 8:
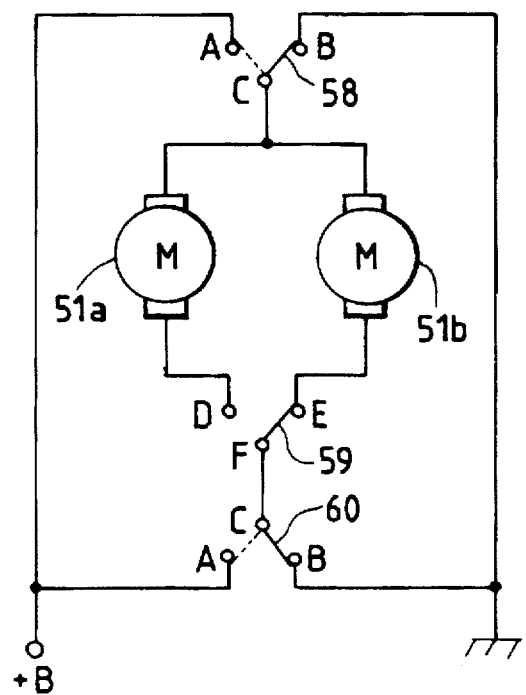
FIG. 8 is a circuit diagram illustrative of an embodiment of a selective driving mechanism of the motor for an on-car apparatus in accordance with the present invention.

FIG. 8 is the circuit diagram illustrative of the embodiment of a selective driving mechanism of the motor for an on-car apparatus in accordance with the present invention. Reference numerals 51a and 51b denote motors and 58 to 60 denote selector switches.

In the drawing, the terminals on one side of the two motors 51a and 51b are connected to moving contact C of the selector switch 58, fixed contact A of the selector switch 58 is connected to the battery, and fixed contact B is connected to the grounding terminal. The terminals on the other side of the motors 51a and 51b are connected to fixed terminal D and fixed terminal E, respectively, of the selector switch 59, the moving contact of the selector switch being connected to the moving contact of the selector switch 60. Fixed contact A of the selector switch 60 is connected to the battery and fixed contact B to the grounding terminal.

The selector switch 59 is used to select either 51a or 51b to be driven. The selector switches 58 and 60 are used to decide the rotational direction of the selector motor. The selector switches 58, 59, and 60 are controlled by the MPU in response to operational action taken by a passenger.

When it is assumed that the selector switches 58 and 60 are both in contact with fixed contacts B, even if a motor has been selected through the selector switch 59, the motor does not run because both terminals of the motor are grounded.

If the selector switch 58 is brought in contact with contacts A and the selector switch 60 is brought in contact with contacts B, with the selector switch 59 set to select the motor 51a, then the motor current flows from the battery of +B voltage to the grounding terminal via the selector switch 58, the motor 51a, and the selector switches 59 and 60, causing the motor 51a to run. When it is assumed that the motor 51a is running in the forward direction at this time, if the selector switch 58 is brought in contact with fixed contact B and the selector switch 60 in contact with fixed contact A, then the motor current flows from the battery of +B voltage to the grounding terminal via the selector switches 60 and 59, the motor 51a, and the selector switch 58, causing the motor 51a to run in the reverse direction. The same operation applies when the motor 51b is selected by the selector switch 59.

Thus, a desired motor can be selected and controlled to stop or reverse the rotation.

Figure 11:
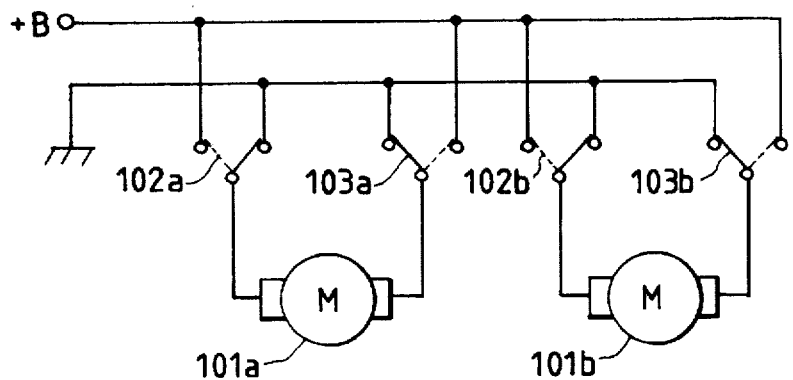
FIG. 11 is a circuit diagram illustrative of an example of a selective driving mechanism of the known on-car motor driving apparatus.

The embodiment will now be compared with the known mechanism shown in FIG. 11 wherein two motors are employed. In comparison with the known mechanism which requires four selector switches 102a, 102b, 103a, and 103b, the embodiment requires only three selectors switches, reducing the required number of switches by one. In general, when n (provided "n" is an integer of 2 or greater) motors are used, 2n selector switches are required to drive the motors as shown in FIG. 11. In the case of the embodiment, only one each of the selector switch 58 and the selector switch 60 is required regardless of the number of motors involved, only the selector switch 59 being a complicated switch which has n moving contacts. As the selector switch 59, a relay switch which opens and closes can be used. When such relay switches are used for n motors, n relay switches are required. In this case, while the total number of necessary switches will be 2n when the motors are connected as illustrated in FIG. 11, the total number will be (n+1) in the embodiment, obviously indicating a reduced number of required switches.

In this embodiment also, each motor can be provided with the self-diagnosing device as shown in FIG. 5.

Thus, according to the present invention, the on-car motor driving apparatus is provided with a voltage measuring device which measures motor driving voltage Vb and a voltage-based time setting device which detects motor current variation Δi from the driving voltage value measured by the voltage measuring device and changes the length of unit time Δt according to current variation Δi; therefore, if driving voltage Vb is lower than the normal voltage value, then the length of unit time Δt is increased according to the voltage value, or if driving voltage Vb is higher than the normal voltage value, then unit time Δt is decreased according to the voltage value.

Since the length of unit time Δt is changed in accordance with the motor driving voltage value, variation Δi per unit time Δt of the current flowing through the motor 1 no longer depends on the driving voltage value. This makes it possible to detect a fixed amount of current variation in the motor 1 at all times, providing an advantage in that both motor torque and motor load at the time when a stuck object is detected can be maintained at a constant level regardless of the fluctuation in the driving voltage.

Further, according to the present invention, since line voltage is supplied to the amplifier of the self-diagnosing device only when the battery voltage is applied to a motor, wasteful power consumption by the amplifier can be eliminated, leading to a significant reduction in power consumed by the self-diagnosing device.

Furthermore, according to the present invention, a motor failure can be detected from the moment the motor is started, making it possible to prevent an object from being caught in a window.

In addition, according to the present invention, the number of switching means used for a plurality of motors can be reduced, contributing to the achievement of a simpler structure and lower price of the mechanism.

What is claimed is:

1. A method for controlling the connection of a motor drive voltage to a motor, the motor drive voltage being applied to the motor by a switching mechanism, the method comprising the steps of:

transmitting switching signals to the switching mechanism such that the switching mechanism connects the motor drive voltage to the motor at a start-up time;

measuring a variation of a current flow through the motor for a predetermined time period after the start-up time; and transmitting switching signals to the switching mechanism such that the switching mechanism disconnects the motor drive voltage from the motor if the measured current flow variation fails to decrease from an inrush peak current value at a predetermined rate during the predetermined time period.

2. The method of claim 1, further comprising the steps of:

after the predetermined time period, measuring a variation of the current flow through the motor; and transmitting switching signals to the switching mechanism such that the switching mechanism disconnects the motor drive voltage from the motor if the measured current flow variation is greater than a second predetermined rate.

3. The method of claim 1, wherein the motor is a bidirectional motor and the step of transmitting switching signals to connect the motor drive voltage causes current flow through the motor in a first direction; and wherein the step of transmitting switching signals to disconnect the motor drive voltage includes transmitting switching signals to the switching mechanism such that current flows through the motor in a second direction for a predetermined period before the switching mechanism disconnects the motor drive voltage from the motor.

* * * * *